United States Patent [19]

Saunders

[11] Patent Number: 5,056,237
[45] Date of Patent: Oct. 15, 1991

[54] ELECTRONIC INDICATING DEVICE FOR COAXIALLY ALIGNING A PAIR OF ROTARY MEMBERS

[75] Inventor: Paul R. Saunders, Bloomfield, Conn.

[73] Assignee: SPM Instrument Inc., Marlborough, Conn.

[21] Appl. No.: 547,689

[22] Filed: Jul. 2, 1990

[51] Int. Cl.$^5$ .......................... G01B 5/25; G01B 7/31
[52] U.S. Cl. ........................................ 33/645; 33/412; 33/366; 33/1 PT
[58] Field of Search ................ 33/644, 645, 655, 661, 33/412, 1 PT, 1 N, 366

[56] References Cited

U.S. PATENT DOCUMENTS

| | | | |
|---|---|---|---|
| 3,786,472 | 1/1974 | Scopacasa | 33/366 |
| 4,033,042 | 7/1977 | Bently | 33/661 |
| 4,193,199 | 3/1980 | Whiteley et al. | 33/1 PT |
| 4,367,594 | 1/1983 | Murray | 33/661 |
| 4,428,126 | 1/1984 | Banks | 33/645 |
| 4,516,328 | 5/1985 | Massey | 33/412 |
| 4,534,114 | 8/1985 | Woyton et al. | 33/645 |
| 4,553,335 | 11/1985 | Woyton | 33/645 |
| 4,586,264 | 5/1986 | Zatezalo | 33/645 |

Primary Examiner—Allan N. Shoap
Assistant Examiner—Alvin Wirthlin
Attorney, Agent, or Firm—McCormick, Paulding & Huber

[57] ABSTRACT

A machine shaft aligning apparatus includes electronic indicating devices for automatically outputting signals to a computer indicative of the magnitude and direction of radial displacement of two coupled shafts as the coupled shafts are rotated to 4 clock positions (i.e. 12, 3, 6, and 9 o'clock). The computer enables calculation and display of horizontal and vertical machine adjustments required to effect proper coaxial alignment of the coupled shafts of the machines.

19 Claims, 4 Drawing Sheets

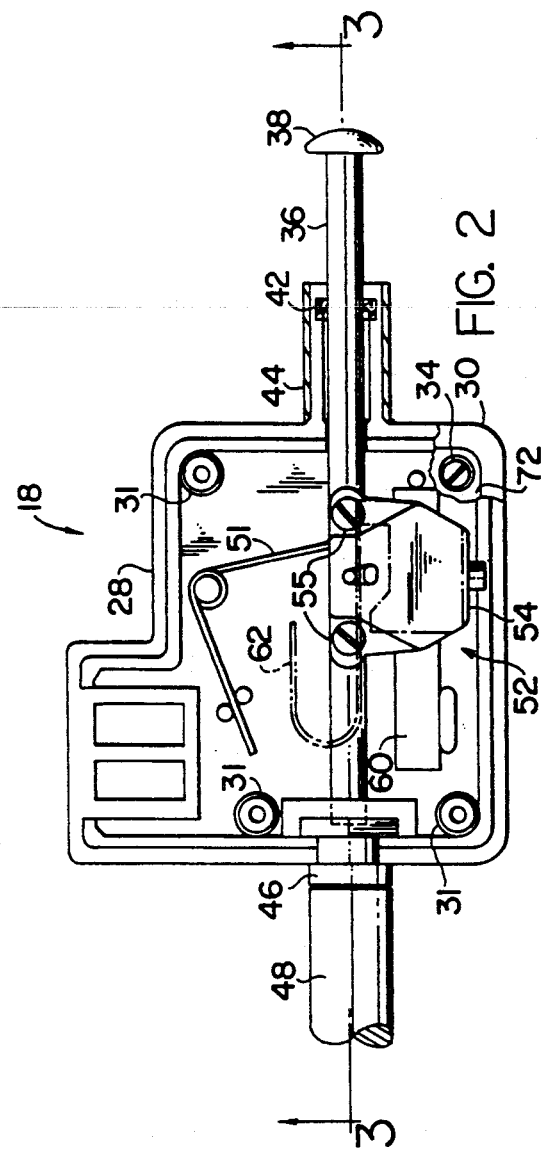
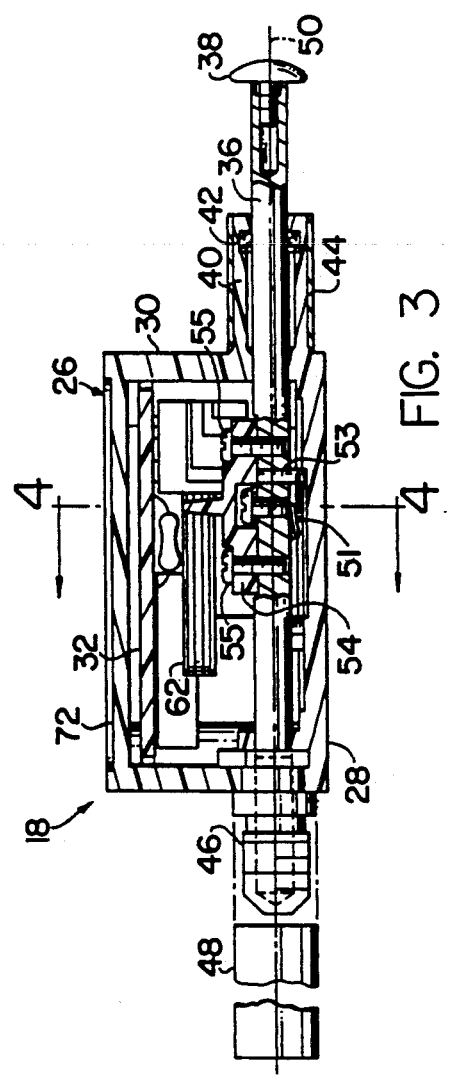

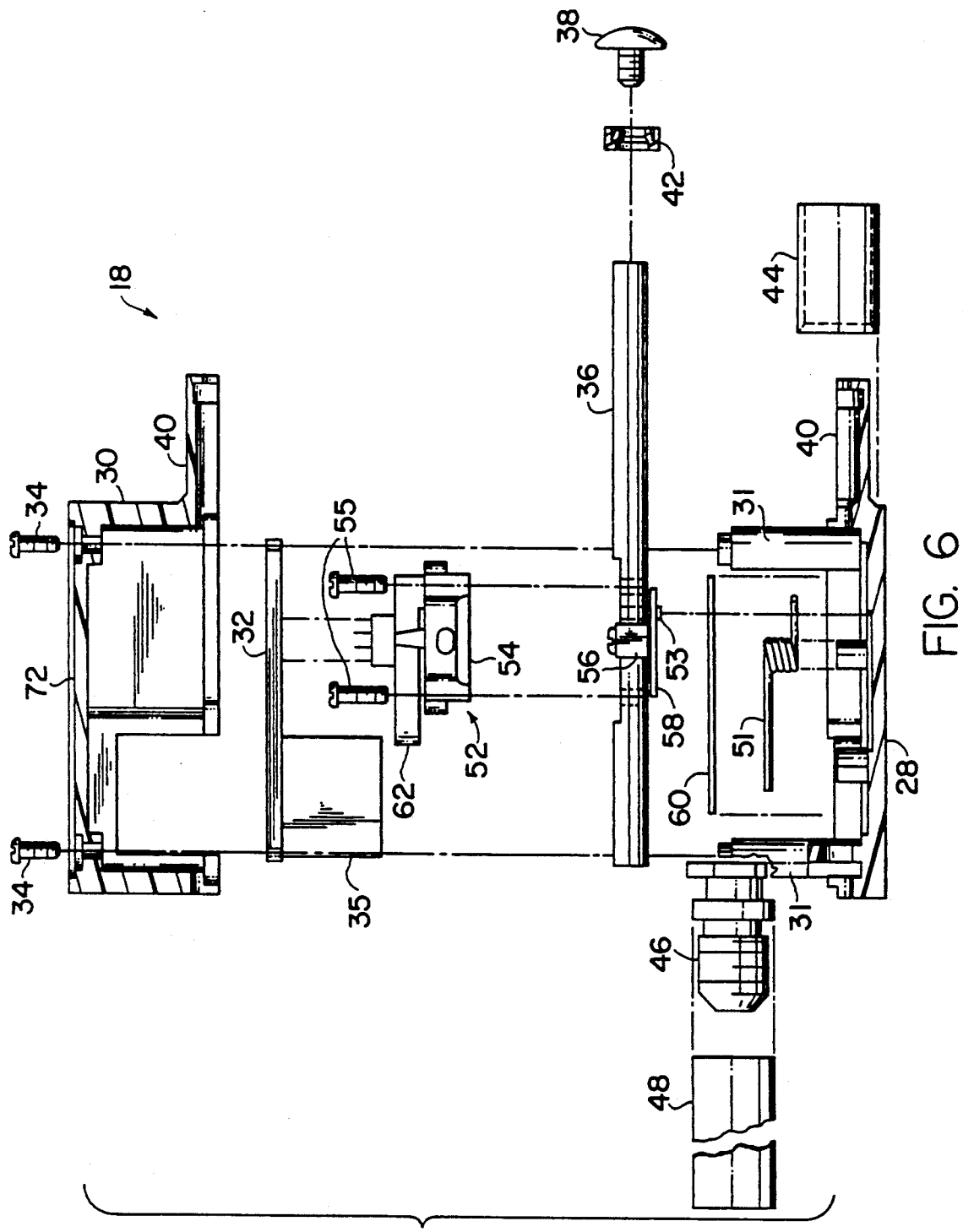

ELECTRONIC INDICATING DEVICE FOR COAXIALLY ALIGNING A PAIR OF ROTARY MEMBERS

BACKGROUND OF THE INVENTION

This invention relates in general to improvements in distance measuring and indicating devices and deals more specifically with an improved electronic indicating device or instrument for monitoring radial displacement of a rotary member. While the instrument of the present invention may have other uses, it is particularly adapted for use in combination with a computer in an apparatus of the type for calculating the shimming adjustments required to effect accurate coaxial alignment between coupled shafts on associated machines and the like.

Accurate alignment of rotating equipment is essential to prevent wear, minimize vibration, and eliminate premature breakdown. Shaft misalignment is a major cause of machinery component failures involving bearings, seals, gears, couplings and the like. Trial and error shaft aligning methods using feeler gauges, straight edges and the like are well-known in the art. However, these methods are time consuming and often do not produce satisfactory results. Well-known alignment methods utilizing dial indicators in aligning coupled shafts eliminate the need to "break" the coupling between shafts and generally enable a more accurate result. However, the various measurements and mathematical solutions necessary to determine the required machine adjustments to attain shaft alignment are time consuming and prone to human error.

Heretofore, computers of specialized function type have been utilized in conjunction with dial indicators in machine alignment apparatus. A typical computer of the aforedescribed type has appropriate equations stored in a memory for calculating required machine adjustments from measurements taken from the machines and entered in proper sequence in the computer. The Machinery Alignment Analyzer MAC-5 produced by SPM Instrument Inc., Marlborough, Conn., assignee of the present invention, is a typical computer of the aforesaid type.

While such a specialized computer substantially reduces the time required to obtain the necessary mathematical solutions, the accuracy of result is largely dependent upon the accuracy of measurements and readings taken from dial indicators at proper angular positions of shaft rotation and entered in proper sequence into the computer.

It is the general aim of the present invention to provide an improved indicating device or instrument for monitoring the radial displacement of a rotary member, and particularly for use in a shaft aligning apparatus to reduce both the time required to effect shaft alignment and the risk of human error associated with the alignment process.

SUMMARY OF THE INVENTION

In accordance with the present invention, an improved electronic indicating device is provided for monitoring radial displacement of a rotary member. The device comprises a housing, mounting means for supporting the housing in fixed position relative to a rotary member for angular movement with the rotary member about the axis of rotation thereof, sensing means supported to move with and relative to the housing for detecting radial displacement of the rotary member, and transducer means disposed within the housing and coupled to the sensing means for generating electrical output signals indicative of radial displacement detected by the sensing means. The device further includes angular position discriminating means disposed within the housing and responsive to changes in angular position of the housing for generating enabling signals at predetermined angular positions of the housing, and coupling means associated with the housing for electrically connecting the transducer means and the angular position discriminating means to a receiving apparatus whereby output signals received from the transducer means are processed by the receiving apparatus in response to enabling signals received by the receiving apparatus from the angular position discriminating means.

BRIEF DESCRIPTION OF THE DRAWINGS

FIG. 2 is a front view of an electronic indicating device embodying the invention shown with the cover and PC board assembly broken away to reveal structure therebehind.

FIG. 3 is a fragmentary sectional view taken along the line 3—3 of FIG. 2.

FIG. 6 is fragmentary exploded sectional view similar to FIG. 3.

DETAILED DESCRIPTION OF PREFERRED EMBODIMENT

Figure 4:
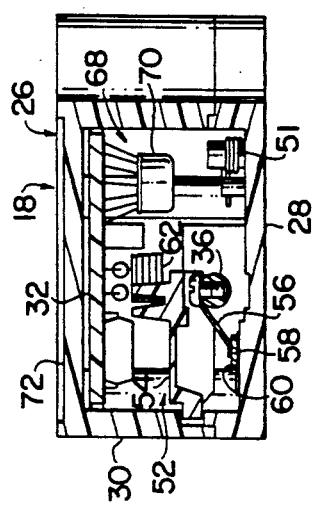
FIG. 4 is a sectional view taken along the line 4—4 of FIG. 3.
Figure 1:
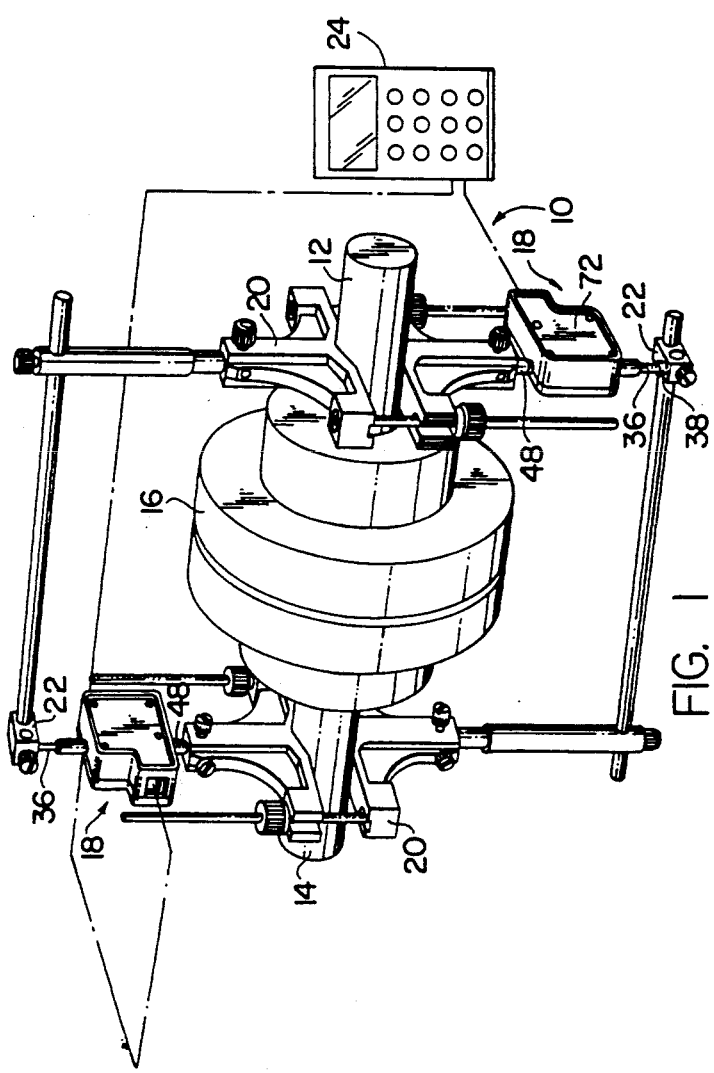
FIG. 1 is a perspective view of a shaft alignment apparatus shown attached to a shaft assembly to be aligned and including electronic indicating devices embodying the present invention.
Figure 5:
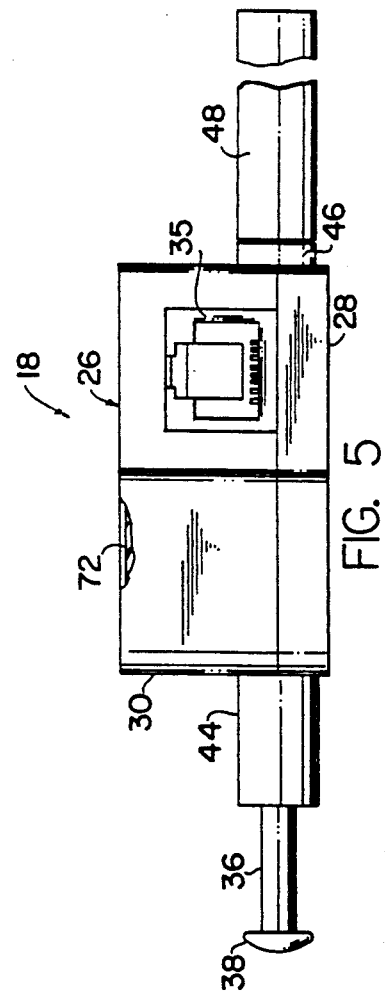
FIG. 5 is a fragmentary side elevational view of the indicating device.

Turning now to the drawings, apparatus for coaxially aligning a pair of coupled rotary members is illustrated in FIG. 1 and indicated generally by the reference numeral 10. The illustrated apparatus 10 is shown mounted on a pair of rotary members or cylindrical shafts which comprise part of a typical machine assembly which includes two machines, (not shown) each supported by independent base structure. The shafts of the two machines, indicated respectively at 12 and 14, are coupled in working relation to each other by a coupling assembly 16 for rotation in unison and comprise a shaft assembly to be coaxially aligned. Ordinarily, the adjustments necessary to effect coaxial alignment of such a shaft assembly will be made to only one of the machines, because the other of the machines may be more difficult to move due to its weight, size or physical attachment to another system or systems, as, for example, a plumbing system or the like. The term "Stationary Machine" (SM) is used to describe the larger machine which will not be moved or otherwise adjusted. Since the adjustments to be made usually involve shimming the machine base structure, the machine to be adjusted is hereinafter designated the "Machine To Be Shimmed" (MTBS). In the alignment process the MTBS will usually require both vertical and horizontal adjustment relative to the SM to achieve coaxial alignment of the respectively associated shafts, such as the shafts 12 and 14.

The illustrated alignment apparatus 10 employs a pair of electronic indicating devices or indicators, designated generally by the numerals 18,18. Each indicator 18 is secured to an associated one of the shafts 12 and 14 by an associated bracket 20,20. The brackets 20,20 also support targets 22,22 which provide reference surfaces for the indicators 18,18. The illustrated apparatus 10 further includes a computer, indicated at 24 and coupled to the indicators 18,18 to receive signals therefrom.

Each indicator 18 is particularly adapted to provide output signals indicative of the magnitude and direction of radical displacement of one shaft relative to the other at predetermined angular positions of the shaft assembly. A computer 24 is electrically connected to the indicators 18,18 to receive signals therefrom and has a keyboard used to input measurement data relative to the machines to be aligned. The computer contains algorithms which enable calculation of shimming adjustments which must be made to the MTBS to bring the shaft thereof into coaxial alignment with the shaft of the SM in a manner generally well known in the machine alignment art. The illustrated computer 24 comprises a Machinery Alignment Analyzer MAC-5 produced and marketed by SPM Instrument Inc., Marlborough, Conn., assignee of the present invention.

Referring now particularly to FIGS. 2-7, a typical indicator 18 has a hollow generally rectangular housing indicated generally at 26, preferably made from dielectric plastic material, and includes a rear part of base 28 and a removable front cover 30. Four mounting posts 31,31 project forwardly from the base 28, support a PC board, indicated at 32, and receive self-tapping fasteners 34,34 (one shown) which secure the PC board and cover 30 in assembly with the base 28. An outwardly open female electrical receptacle or modular connector 35 of the type well known in the telecommunication field and containing a plurality of individual spring contacts is mounted on the PC board 32 as shown in FIG. 6 and is received within a complementary laterally outwardly projecting portion of the housing when the cover 30 is assembled with the base 28.

An axially elongate generally cylindrical sensing member or indicator shaft 36 extends through the hollow housing 26, projects for some distance from one end of the housing, and carries a contact 38 at its free end. The indicator shaft 36 is supported at the one end of the housing 26 by a generally cylindrical split support member 40, defined by the base 28 and the cover 30, which contains an annular indicator shaft bushing 42. A tubular sleeve 44 coaxially surrounds the two halves of the split support member 40 in assembly to maintain its integrity as a support for the indicator shaft 36. The opposite end portion of the indicator shaft 36 is slidably received within another support member 46 secured in fixed position to the opposite end portion of the base 28. A threaded outer end portion of the support member 46 is threadably engaged within and maintains a generally cylindrical mounting post 48 in coaxial alignment with the indicator shaft 36, as best shown in FIG. 3. Thus, the indicator shaft 36 is supported in cantilever position on the housing 26 for reciprocal sliding movement along a rectilinear path defined by the longitudinal axis of the indicator shaft, indicated by the numeral 50 (FIG. 3). A torsion spring 51 supported on a mounting post which projects from the base 28 acts between the base and a pin 53 carried by the indicator shaft 36 to bias the indicator shaft toward its projected position as it appears in FIGS. 2, 3 and 5.

Figure 7:
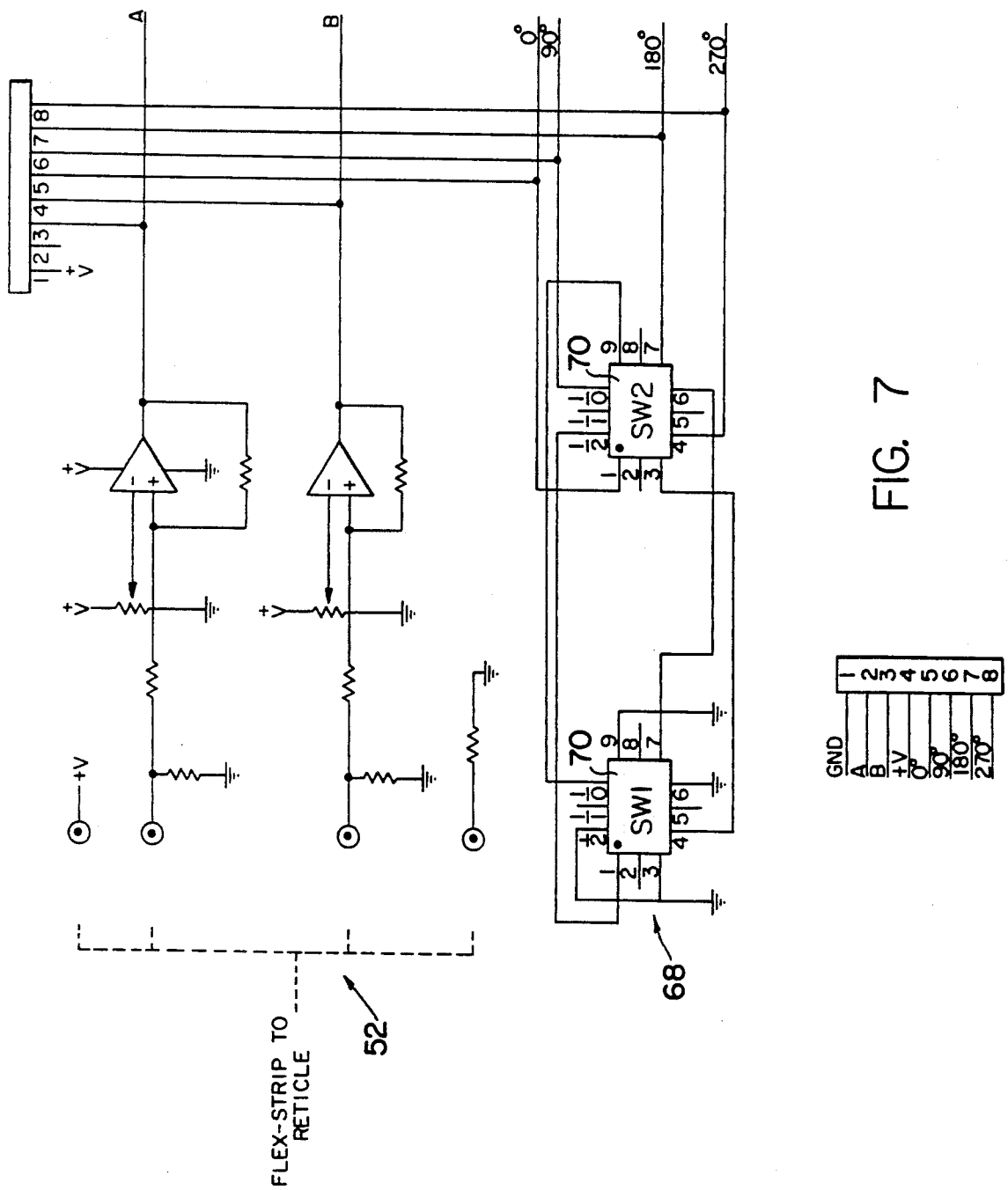
FIG. 7 is a diagrammatic view of the electronic indicating device.

The indicator shaft 36 is coupled to a transducer or optical encoder of a well known type indicated generally by the numeral 52 and contained within the housing 26. The optical encoder 52 generates output signals indicative of the direction and magnitude of linear displacement of the indicator shaft 36 along the path 50 and includes a transmitter/receiver 54 which carries two LED's and two phototransistors. The transmitter/receiver 54 is secured to the indicator shaft 36 by fasteners 55 to travel with it. The optical encoder 52 further includes a leaf spring 56 which carries a reticle 58. The leaf spring biases the reticle 58 into engagement with a glass scale 60 mounted in fixed position on the housing base 28 and along which the reticle 58 travels in response to rectilinear displacement of the indicator shaft relative to the housing 28. A flexible conductor or ribbon cable 62 connects the two Led's and the two phototransistors carried by the transmitter/receiver 54 to associated amplification circuits on the PC board 32, as shown in FIG. 7, which are, in turn, connected to spring contacts in the modular connector 35 to provide output signals on channels A and B, FIG. 7, which signals are 90 degrees out of phase and which may be converted to a measurement output by an external phase quadrature detector for processing by the computer 24.

The electronic indicator of the present invention also has an angular position discriminator responsive to changes in the angular position of the indicator housing for providing enabling signals at predetermined angular positions of the housing. The presently preferred electronic indicator 18 has a position discriminator, indicated generally at 68, capable of providing enabling signals at four clock positions of the housing, namely 12, 3, 6 and 9 o'clock. The enabling signals produced by the illustrated angular position discriminator 68 are utilized in the apparatus 10 to enable measurement data generated by the optical encoder 52 to be automatically processed by the computer 24 each time that the shaft assembly to be aligned attains one of the aforesaid clock positions.

The illustrated angular position discriminator 68 essentially comprises at least one electrical switch responsive to changes in angular position, but preferably, and as shown, the angular position discriminator includes two such identical position switches indicated at 70,70. Preferably each switch 70 comprises a Series 2009 Signal Systems International positioning switch, available from Signal Systems International, Holmdel, N.J. 07733, and capable of monitoring rotation.

Each switch 70 has twelve independent electrical contacts spaced at 30 degree increments about a switch axis and contained within a hermetically sealed housing which also contains a ball of mercury. The ball of mercury spans a distance greater than the distance between adjacent contacts. When such a switch is mounted with its axis oriented in a generally horizontal position, it is capable of monitoring rotation. Each 30 degrees of rotation causes the mercury to close on a new switch contact.

The two switches 70,70 are mounted on the PC board 32 (one shown in FIG. 4) with the axes thereof generally normal to the frontal surface of the indicator housing cover 30, which surface is hereinafter designated as a reference surface and indicated by the numeral 72. Eight of the twelve contacts in each switch 70 are paired to provide four equangularly spaced sets of active contacts; each set of active contacts including two angularly adjacent contacts. The active contacts in each set are separated from the active contacts in the next angularly adjacent set by an unused or inactive contact. Thus, the resulting four sets of active contacts in each switch are spaced at 90 degree increments about the axis of the switch.

Since the ball of mercury in each switch 70 spans a distance greater than the spacing between the active contacts of each set, a single such switch will not provide immediate response to rotation in both clockwise and counterclockwise directions. It will be understood that a set of active contacts at the six o'clock position of the switch will normally be closed by the ball of mercury to complete a circuit path through the switch. The switch may be arranged so that slight rotation in a counterclockwise direction, for example, will cause the leading contact at the 6 o'clock position to immediately or almost immediately escape from the ball of mercury to open or change the switch from a conducting to a nonconducting state. However, the same condition will not occur when the switch is rotated in an opposite or clockwise direction, because the other contact, which then becomes the leading contact in the active set, will remain within the ball of mercury throughout a somewhat greater degree of angular movement of the switch. Thus, a single switch arranged in the aforedescribed manner relative to the indicator 18 will have differing operating characteristics when rotated in clockwise and in counterclockwise directions. To overcome the aforesaid problem, two switches 70,70 are utilized in the indicator 18 and designated SW1 and SW2 in FIG. 7. Each set of active contacts in SW1 is connected in electrical series to an associated set of active contacts in SW2. However, SW1 is angularly offset 25 degrees in a clockwise direction with respect to SW2, so that the mercury ball will simultaneously close the associated connected active contacts in both SW1 and SW2. Slight angular movement of the indicator in either clockwise or counterclockwise direction will cause one or the other of the associated sets of series connected contacts to open thereby interrupting the circuit path through the switches 70,70. Thus, the operational characteristics of the indicator will be substantially identical regardless of the direction of indicator rotation.

The shaft alignment apparatus 10 illustrated in FIG. 1 is setup to align a pair of coupled shafts using the indicator reverse method, well known in the shaft alignment art. Each indicator 18 is supported on an associated one of the shafts 12 and 14 by associated mounting brackets 20 with the axis 50 thereof disposed in a radial direction relative to the related shaft. Each indicator is mounted with its reference surface 72 disposed generally within a radial plane of an associated shaft. Thus, it should now be apparent that the central axes of the switches 70,70 within each indicator 18 are disposed in generally axially parallel relation to the axis of an associated one of the shafts 14 and 16.

The illustrated machinery alignment analyzer or calculator 24 contains algorithms related to a plurality of alignment methods and enables the user to select an appropriate alignment method and correctly align machinery in both vertical and horizontal direction in accordance with the method selected. The calculator 24 has a large graphic display which shows all of the measurements required to assure precise alignment. After the selected alignment method has been entered in the computer, in the present instance the indicator reverse method, the computer 24 "asks" the operator for the required measurements related to the particular setup.

After the required measurements have been manually entered in proper sequence in the computer the shaft assembly is slowly rotated through four clock positions, (i.e. 12, 3, 6 and 9 o'clock). As each indicator 18 moves through a 90 degree angular increment between clock positions the transducers 52,52 associated with the indicators generate electrical output pulses, indicative of the magnitude and direction of radial displacement indicator shafts 36,36. The pulses are counted and the results are stored in the computer 24 and processed in response to enabling signals received by the computer from the angular position discriminators 68,68.

The computer 24, using industry accepted methods, calculates and displays the corrections necessary for proper shaft alignment. The required machine movement in both horizontal and vertical directions and the amount of shimming necessary for the front and back feet of the MTBS is displayed by the computer. The computer display may also provide an indication of the offset and angle of the two shafts at the coupling center line.

I claim:

1. An electronic indicating device for monitoring radial displacement of a rotary member and comprising a housing, mounting means for supporting said housing in fixed position relative to the rotary member for angular movement with the rotary member and about the axis of rotation of the rotary member, sensing means supported to move with the housing and relative thereto for detecting radial displacement of the rotary member, transducer means disposed within said housing and coupled to said sensing means within said housing for generating output signals indicative of the magnitude of radial displacement detected by said sensing means, angular position discriminating means disposed within said housing and comprising a pair of rotary electrical switches connected together in electrical series, said switches being responsive to changes in the angular position of said housing for generating enabling signals at predetermined angular positions of said housing, and coupling means associated with said housing for electrically connecting said transducer means and said angular position discriminating means to a receiving apparatus whereby said output signals received from said transducer means are processed by the receiving apparatus in response to said enabling signals received by the receiving apparatus from said angular position discriminating means.

2. An electronic indicating device as set forth in claim 1 wherein said sensing means comprises an axially elongate member supported on and projecting from said housing for reciprocal rectilinear movement in a longitudinal axial direction.

3. An electronic indicating device as set forth in claim 2 wherein said angular position discriminating means has an operational axis extending in a direction generally normal to said longitudinal axial direction.

4. An electronic indicating device as set forth in claim 3 wherein said housing has a reference surface thereon and said operational axis is oriented in a predetermined position relative to said reference surface.

5. An electronic indicating device as set forth in claim 2 wherein the rotary member comprises a generally cylindrical member and said mounting means is further characterized as means for supporting said housing on the rotary member with the longitudinal axis of said axially elongate member radially disposed relative to the rotary member.

6. An Electronic indicating device as set forth in claim 1 wherein said transducer means comprises means for generating output signals indicative of both the magnitude and direction of said radial displacement detected by said sensing means.

7. An electronic indicating device as set forth in claim 6 wherein said transducer means comprises an optical encoder.

8. An electronic indicating device as set forth in claim 1 wherein each of said electrical switches includes a plurality of equiangularly spaced apart sets of active electrical contacts, each set of active electrical contacts in one of the switches being connected in electrical series to an associated set of active electrical contacts in the other of the switches, said sets of active electrical contacts in said one switch being angularly offset relative to said associated sets of electrical contacts in said other switch.

9. An electronic indicating device as set forth in claim 1 wherein each of said switches has a switch axis and a plurality of sets of active electrical contacts equiangularly spaced about said switch axis.

10. An electronic indicating device as set forth in claim 1 wherein said coupling means comprises a modular electrical connector mounted in fixed position relative to said housing for mating engagement with another electrical connector associated with the receiving apparatus.

11. An electronic indicating device comprising a housing, mounting means for supporting said housing in fixed position on an associated rotary member, an axially elongate sensing member supported in cantilever position on said housing for rectilinear reciprocal movement in a longitudinal axial direction relative to said housing, an optical encoder disposed within said housing and coupled to said sensing member within said housing for generating output signals indicative of linear displacement of said sensing member relative to said housing, at least one positioning switch disposed within said housing and responsive to changes in the angular position of said housing for providing enabling signals at predetermined angular positions of said housing, and an electrical connector associated with said housing for coupling said optical encoder and said at least one positioning switch to a computer whereby said output signals received from said optical encoder are processed by the computer in response to said enabling signals received by the computer from said at least one positioning switch.

12. An electronic indicating device as set forth in claim 11 wherein said at least one positioning switch has an operational axis extending in a direction generally normal to said longitudinal axial direction.

13. An electronic indicating device as set forth in claim 12 wherein said housing has a reference surface thereon and said operational axis is generally normal to said reference surface.

14. An electronic indicating device as set forth in claim 11 wherein said mounting means comprises an axially elongate cylindrical mounting member supported in cantilever position on said housing and said sensing member comprises a cylindrical member coaxially aligned with said mounting member.

15. An electronic indicating device as set forth in claim 14 wherein said mounting means comprises means for supporting said housing on a rotary member with the axis of said elongate sensing member radially disposed relative to the rotary member.

16. An electronic indicating device as set forth in claim 15 wherein said mounting means includes a mounting bracket for clamping engagement with the rotary member.

17. Electronic indicating device as set forth in claim 11 wherein said one positioning switch comprises a mercury switch.

18. An electronic indicating device as set forth in claim 11 wherein said device has two positioning switches connected together in electrical series.

19. An electronic indicating device as set forth in claim 18 wherein each of said positioning switches has an axis and a plurality of sets of active electrical contacts equiangularly spaced about said axis, each set of active electrical contacts in one of said switches is electrically connected to an associated set of active electrical contacts in the other of said switches, and said active electrical contacts in said other of said switches are angularly offset relative to said active electrical contacts in said one of said switches.

* * * * *